United States Patent
Sato et al.

(10) Patent No.: US 7,654,924 B2
(45) Date of Patent: Feb. 2, 2010

(54) AUTO-TENSIONER

(75) Inventors: Seiji Sato, Iwata (JP); Satoshi Kitano, Iwata (JP); Yoshiaki Ryouno, Iwata (JP); Kouichi Onimaru, Iwata (JP)

(73) Assignee: NTN Corporation, Osaka (JP)

( * ) Notice: Subject to any disclaimer, the term of this patent is extended or adjusted under 35 U.S.C. 154(b) by 67 days.

(21) Appl. No.: 11/987,977

(22) Filed: Dec. 6, 2007

(65) Prior Publication Data

US 2008/0139352 A1 Jun. 12, 2008

(30) Foreign Application Priority Data

Dec. 8, 2006 (JP) .............................. 2006-331899
Dec. 8, 2006 (JP) .............................. 2006-331927

(51) Int. Cl.
*F16H 7/08* (2006.01)
(52) U.S. Cl. ...................................... 474/110; 474/111
(58) Field of Classification Search ................. 474/101, 474/109, 110, 111
See application file for complete search history.

(56) References Cited

U.S. PATENT DOCUMENTS 6,086,497 A * 7/2000 Fukuda et al. .............. 474/110

2002/0065159 A1 * 5/2002 Markley ..................... 474/110
2008/0280711 A1 * 11/2008 Sato et al. ................... 474/110

FOREIGN PATENT DOCUMENTS

JP 64-41755 3/1989
JP 2005180537 A * 7/2005

* cited by examiner

*Primary Examiner*—Robert A Siconolfi
*Assistant Examiner*—Anna Momper
(74) *Attorney, Agent, or Firm*—Wenderoth, Lind & Ponack, L.L.P.

(57) ABSTRACT

An auto-tensioner includes a housing having an open end and a closed bottom at another end. A cylindrical plunger is slidably inserted in the housing with its open end facing the closed bottom of the housing and its other end protruding from the housing. A ring-shaped seal member is mounted between the inner periphery of the housing and the outer periphery of the plunger for hermetically sealing oil in the housing. A screw rod and a nut member are mounted in the plunger so as to be coaxial with the plunger, with the nut member in threaded engagement with the screw rod. A return spring is mounted between the nut member and the plunger to bias the nut member and the plunger in a direction axially away from each other. A spring is mounted between the screw rod and the closed bottom of the housing to bias the screw rod in a direction away from the closed bottom of the housing.

6 Claims, 4 Drawing Sheets

AUTO-TENSIONER

BACKGROUND OF THE INVENTION

This invention relates to an auto-tensioner used mainly to maintain tension of a timing chain or belt for driving camshafts of an engine.

In a typical engine, the rotation of its crankshaft is transmitted to camshafts through a timing chain or belt (the following description is made for a timing chain only) received in an engine cover to rotate the camshafts, thereby opening and closing valves mounted to combustion chambers. In order to keep the tension of the chain within a proper range, a tension adjusting device is typically used which comprises a chain guide pivotable about a shaft, and a chain tensioner for pressing the chain guide against the chain.

Among chain tensioners mounted in such tension adjusting devices, one as disclosed in JP utility model publication 64-41755 is known which includes a cylindrical housing having open and closed ends, a rod axially slidably inserted in the housing, an oil seal mounted in the housing at its open end for sealing oil in the housing, a return spring mounted in the housing to bias the rod in a direction away from the closed bottom of the housing, a screw rod mounted in the housing and having an external thread on its outer periphery which is in threaded engagement with an internal thread formed on the inner periphery of the rod at its end portion, and a spring mounted between the screw rod and the rod and biasing the screw rod away from the rod.

While the camshafts are being driven with the chain vibrating, when the tension of the chain increases, the rod repeatedly moves back and forth within the range of the gap between the internal and external threads, with the screw rod slowly rotating. The rod thus axially moves to a position where the biasing force of the return spring balances with the tension of the chain, thereby reducing the tension of the chain.

When the tension of the chain decreases, the rod moves in a direction away from the bottom of the housing until the force of the return spring balances with the tension of the chain. When the rod moves in this direction by a predetermined distance, the screw rod momentarily separates from the bottom of the housing. But soon thereafter, the screw rod moves axially while turning under the force of the spring, and abuts the bottom of the housing again.

When the engine is stopped, the screw rod remains in abutment with the bottom of the housing. In this state, although the tension of the chain may be greater than the biasing force of the return spring, because the chain does not vibrate, the screw rod never rotates, so that the rod does not move toward the bottom of the housing. Thus, when the engine is restarted, the tensioner can quickly remove any slackness of the chain, so that the tension of the chain can be kept stable.

In this auto-tensioner, because the internal thread which threadedly engages the external thread of the screw rod is directly formed on the rod, if a force acts on the end of the rod protruding from the housing in a direction perpendicular to the axis of the rod, the axes of the internal and external threads tend to be displaced from each other, which in turn increases the resistance to rotation of the screw rod relative to the rod.

Thus, if a force is applied to the end of the rod protruding from the housing in a direction perpendicular to the axis of the rod (such a force is applied if e.g. the chain guide pivots due to increased tension of the chain, so that the contact point between the chain guide and the rod moves), the resistance to rotation of the screw rod relative to the rod increases, so that it may become difficult to sufficiently reduce fluctuations in tension of the chain.

Another problem with this auto-tensioner is that because the rod cannot move sufficiently quickly when the tension of the chain increases, if the tension of the chain changes sharply while the engine is running (due e.g. to resonance of the engine or large fluctuations in torque of the crankshaft per combustion cycle), it is impossible to sufficiently reduce the tension of the chain. Thus, the tension of the chain may increase excessively while the engine is running.

An object of the present invention is to provide an auto-tensioner which operates stably even if a force is applied to the end of the rod protruding from the housing in a direction perpendicular to the rod axis.

SUMMARY OF THE INVENTION

In order to achieve this object, the present invention provides an auto-tensioner comprising a housing having an open end and a closed bottom at another end, a cylindrical plunger having an opening that faces the closed bottom of the housing and slidably inserted in the housing with one end thereof protruding from the housing, a ring-shaped seal member mounted between an inner periphery of the housing and an outer periphery of the plunger for hermetically sealing oil in the housing, a screw rod and a nut member that are mounted in the plunger so as to be coaxial with the plunger, with the nut member in threaded engagement with the screw rod, a return spring mounted between the nut member and the plunger and biasing the nut member and the plunger in a direction axially away from each other, and a spring mounted between the screw rod and the closed bottom of the housing and biasing the screw rod in a direction away from the closed bottom of the housing.

Preferably, the plunger has a bottom portion, and the auto-tensioner further comprises a spring member, and a spring bearing disposed between the screw rod and the bottom portion of the plunger and supported by the bottom portion of the plunger through the spring member, the screw rod being in abutment with the spring bearing.

The spring bearing may include a stopper portion configured to abut the bottom portion of the plunger when the spring member is compressed.

The spring member may comprise at least two axially adjacent wave washers, and a flat washers disposed between the at least two wave washers.

The plunger may be formed by deep drawing a metallic plate.

The seal member may comprise an O-ring.

Because the screw rod and the nut member are both formed separately from the plunger, any force applied to the end of the plunger protruding from the housing in a direction perpendicular to the axis of the plunger is less likely to be transmitted to the screw rod, so that the axes of the external and internal threads are less likely to be displaced from each other. This ensures stable operation of the auto-tensioner.

Because the screw rod and the nut member are received in the cylindrical plunger having a closed bottom, the screw rod and the nut member overlap with the plunger in the direction perpendicular to their axis. The entire auto-tensioner is thus sufficiently short in length, and can be mounted in a small space.

In an arrangement in which a spring bearing is mounted between the screw rod and the bottom portion of the plunger so as to be supported by the bottom portion of the plunger through a spring member, if the tension of the chain increases sharply, the spring member is compressed, thus quickly reducing the tension of the chain. Thus, even while the tension of the chain is changing sharply, the tension of the chain is less likely to increase excessively.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
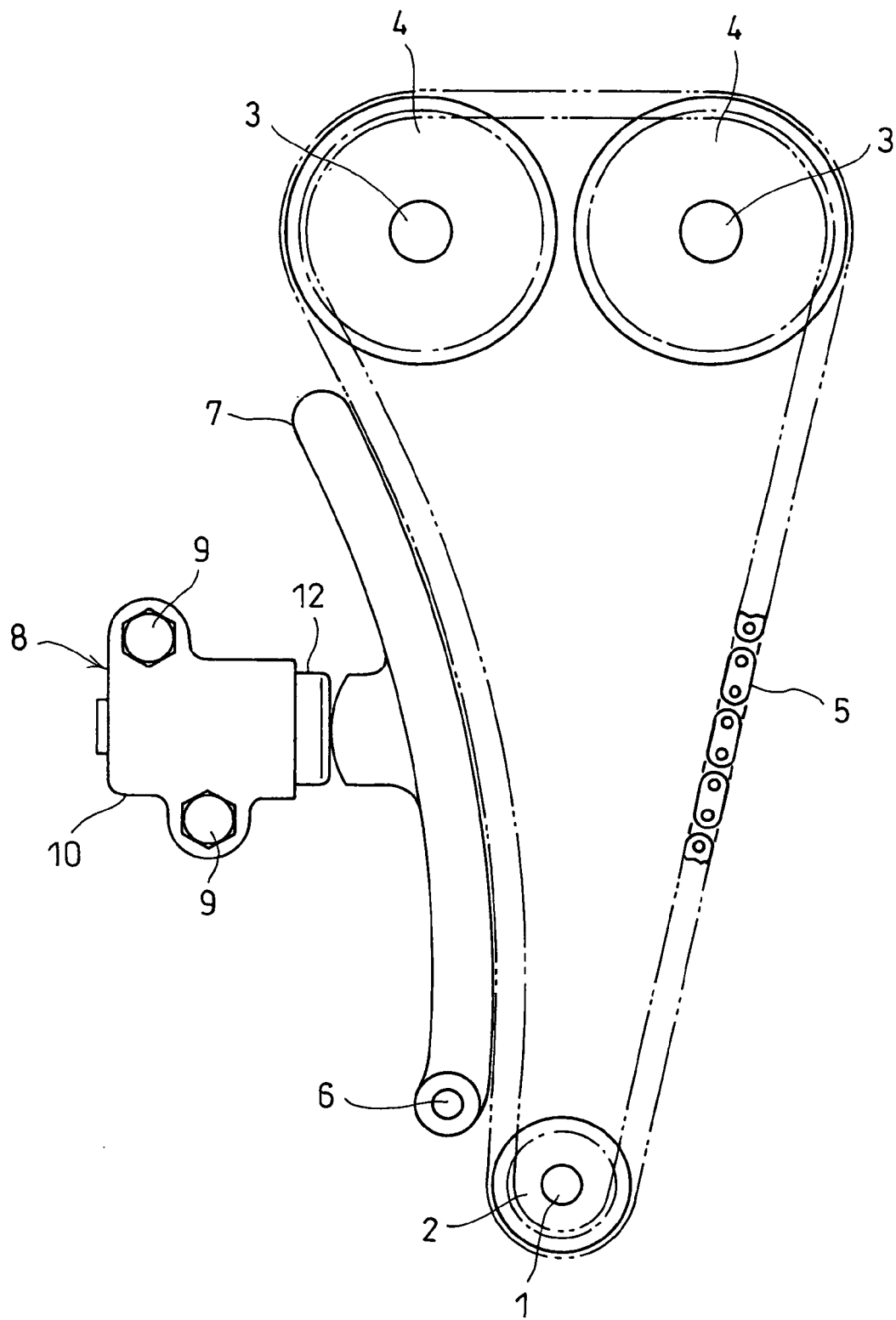
FIG. 1 is a front view of a chain transmission device including an auto-tensioner according to a first embodiment of the present invention.

FIG. 1 shows a chain transmission device including an auto-tensioner according to the first embodiment of the present invention. This chain transmission device further includes a sprocket 2 fixed to the crankshaft 1 of an engine, sprockets 4 each fixed to one of camshafts 3, and a chain 5 through which the sprockets 2 and 4 are coupled together. The rotation of the crankshaft 1 is transmitted to the camshafts 3, thereby rotating the camshafts 3. Thus, valves (not shown) in the combustion chambers are repeatedly opened and closed.

A chain guide 7 pivotally supported on a shaft 6 fixed to an engine block (not shown) is in contact with the chain 5, and is pressed against the chain 5 by means of the auto-tensioner 8.

Figure 2:
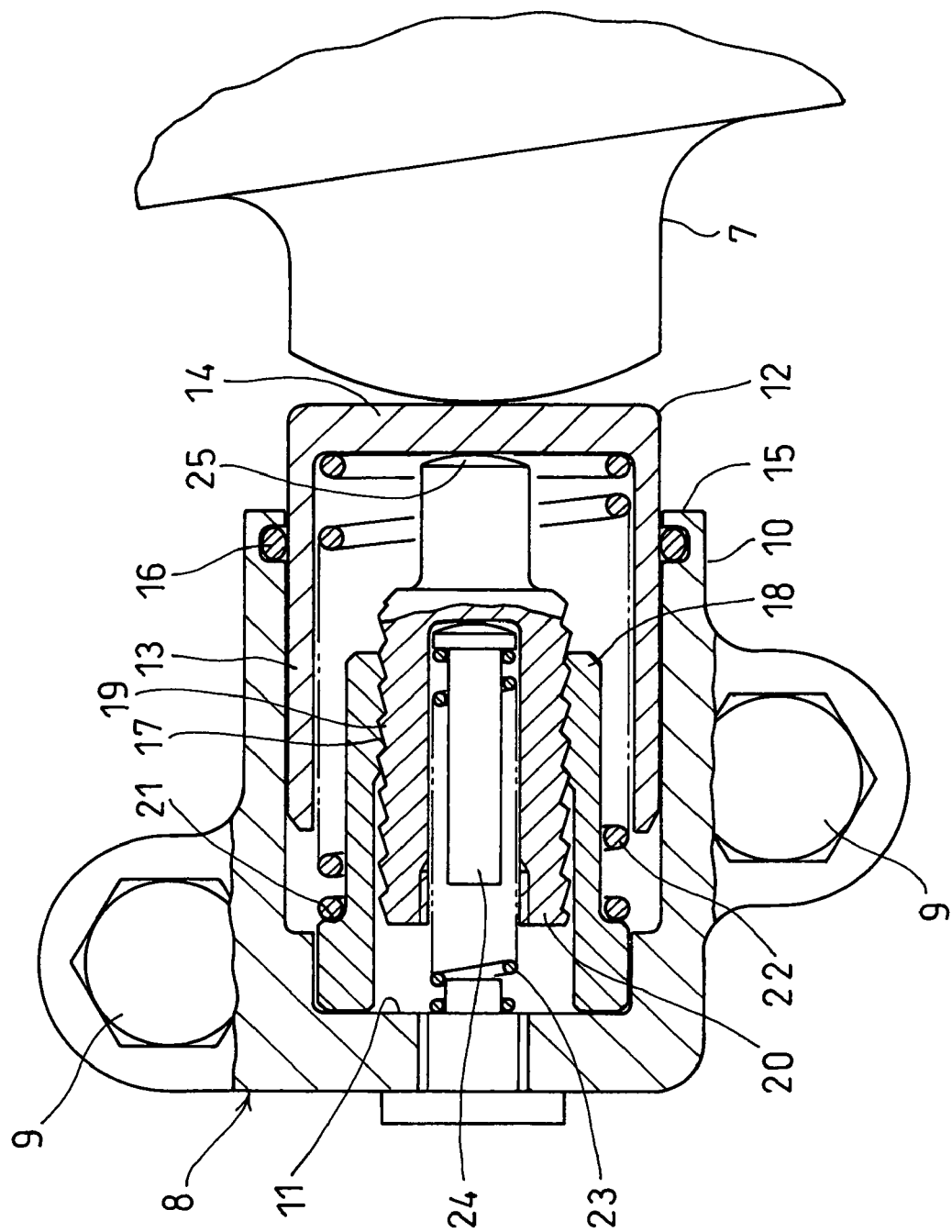
FIG. 2 is an enlarged sectional view of the auto-tensioner shown in FIG. 1.

The auto-tensioner 8 includes a housing 10 fixed to the engine block by means of bolts 9. As shown in FIG. 2, the housing 10 has open and closed ends. In the housing 10, a plunger 12 having an open end facing the bottom 11 of the housing 10 and an opposite closed end is axially slidably inserted. The plunger 12 comprises a cylindrical portion 13 having its outer periphery fitted in the housing 10 and in sliding contact with the inner wall of the housing 10, and a bottom portion 14 formed at the end of the cylindrical portion 13 remote from the bottom 11 of the housing 10 and protruding from the open end 15 of the housing 10. The plunger 12 is formed by deep-drawing a metallic plate.

A ring-shaped seal member 16 is fitted in the inner periphery of the housing 10 so as to contact the outer periphery of the plunger 12. The seal member 16 hermetically seals oil in the housing 10. The seal member 16 may be a rubber O-ring.

A nut member 18 is mounted in the plunger 12 so as to be coaxial with the plunger 12. The nut member 18 has an internal thread 17 formed on the inner periphery thereof and in threaded engagement with an external thread 19 formed on the outer periphery of a screw rod 20, which is also mounted in the plunger 12 so as to be coaxial with the plunger 12. The nut member 18 has a large-diameter portion at its end remote from the bottom portion 14 of the plunger 12 to define a shoulder 21 at the end of the large-diameter portion nearer to the bottom portion 14. A return spring 22 is mounted between the shoulder 21 and the bottom portion 14 to bias the nut member 18 and the plunger 12 axially away from each other.

The internal thread 17 and the external thread 19 are in threaded engagement with each other with an axial play therebetween. The internal and external threads 17 and 19 both have such an asymmetrical serration-shaped axial section that their pressure flanks, i.e. the flanks which support the pressure on the screw rod 20 that tends to move the screw rod 20 toward the bottom 11 of the housing 10, have a greater flank angle than their clearance flanks.

Between the bottom 11 of the housing 10 and the screw rod 20, a spring seat 24 is mounted which is biased toward the screw rod 20 by a spring 23 with one end thereof in abutment with the screw rod 20. Thus, the spring 23 biases the screw rod 20 through the spring seat 24 in a direction away from the bottom 11 of the housing 10. The screw rod 20 has a spherical end surface 25 that is in abutment with the bottom portion 14 of the plunger 12.

The operation of the auto-tensioner 8 is now described.

While the camshafts 3 are being driven with the chain vibrating, when the tension of the chain 5 increases, the screw rod 20 repeatedly moves back and forth within the range of the gap between the internal and external threads 17 and 19, with the screw rod 20 slowly rotating relative to the nut member 18. The plunger 12 thus axially moves to a position where the sum of the biasing forces of the return spring 22 and the spring 23 balances with the tension of the chain 5, thereby reducing the tension of the chain 5.

When the tension of the chain 5 decreases, the plunger 12 is moved in a direction away from the bottom 11 of the housing 10 until the sum of the biasing forces of the return spring 22 and the spring 23 balances with the tension of the spring. When the plunger 12 moves in this direction by a distance larger than the gap between the internal and external threads 17 and 19, the bottom portion 14 of the plunger 12 momentarily separates from the end surface 25 of the screw rod 20. But soon thereafter, the screw rod 20 moves axially while turning relative to the nut member 18 under the force of the spring 23, and abuts the bottom portion 14 of the plunger 12 again.

When the engine is stopped, due to fluctuations in rotational resistance of the camshafts 3, the tension of the chain 5 may be higher than the sum of the biasing forces of the return spring 22 and the spring 23. But once the engine stops, because the chain 5 does not vibrate, the screw rod 20 does not rotate relative to the nut member 18, so that the plunger 12 does not move axially. Thus, when the engine is restarted, the tensioner can quickly remove any slackness of the chain 5, so that the tension of the chain 5 can be kept stable.

Because the screw rod 20 and the nut member 18 are both formed separately from the plunger 12, any force applied to the bottom portion 14 of the plunger 12 in a direction perpendicular to the axis of the plunger 12 is less likely to be transmitted to the screw rod 20. Thus, even if a force is applied to the bottom portion 14 of the plunger 12 (such a force is applied if e.g. the chain guide 7 pivots due to increased tension of the chain 5, so that the contact point between the chain guide 7 and the plunger 12 moves), the axes of the internal and external threads 17 and 19 are less likely to be displaced from each other. This ensures stable operation of the auto-tensioner.

Because the screw rod 20 and the nut member 18 are mounted in the cylindrical plunger 12 having a closed bottom, the screw rod 20 and the nut member 18 are arranged so as to overlap with the cylindrical portion 13 of the plunger 12 in the direction perpendicular to the axis of the plunger 12. This contributes to a reduced axial length of the auto-tensioner 8 and makes it possible to mount the auto-tensioner 8 in a smaller space.

Figure 3:
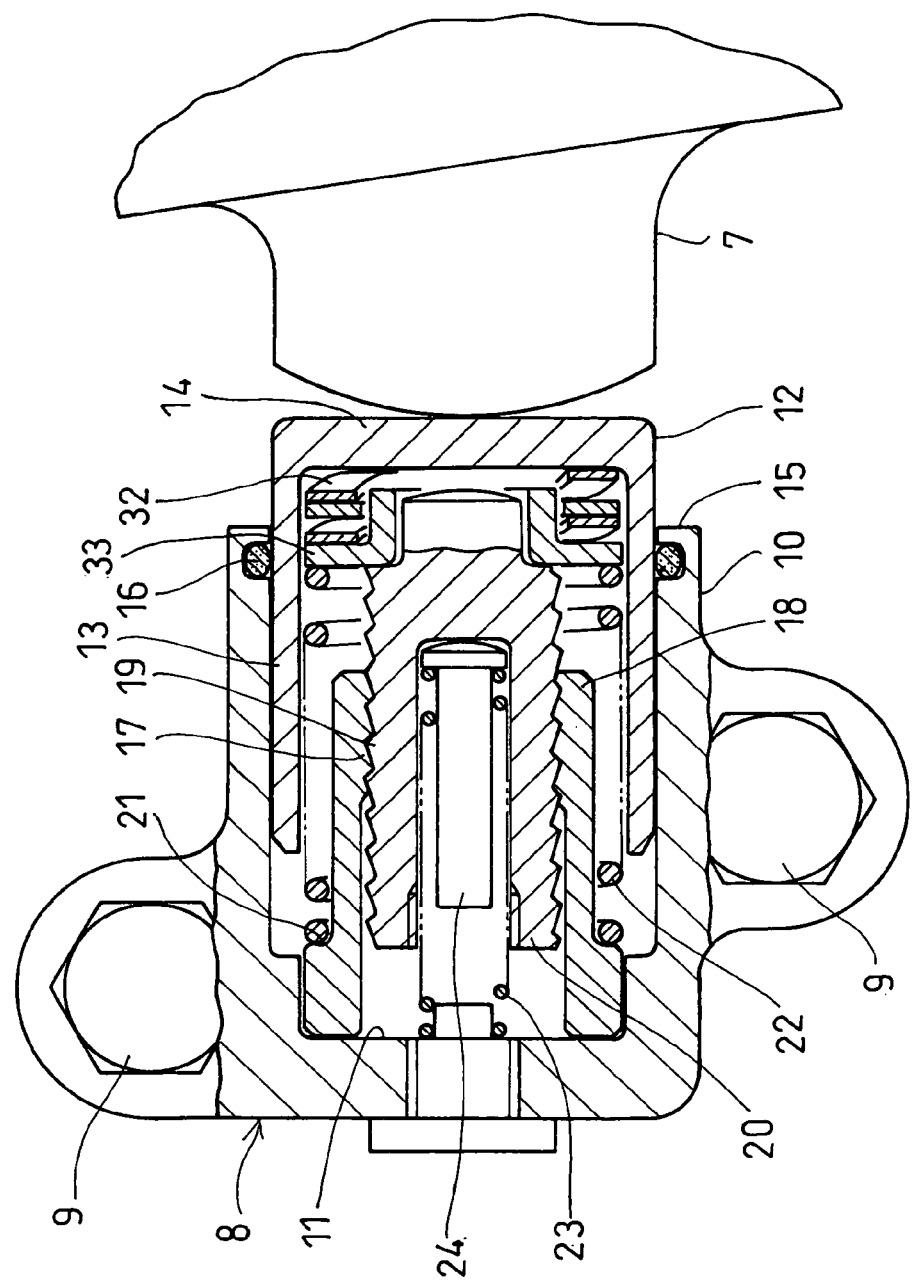
FIG. 3 is an enlarged sectional view of an auto-tensioner according to a second embodiment of the present invention.
Figure 4:
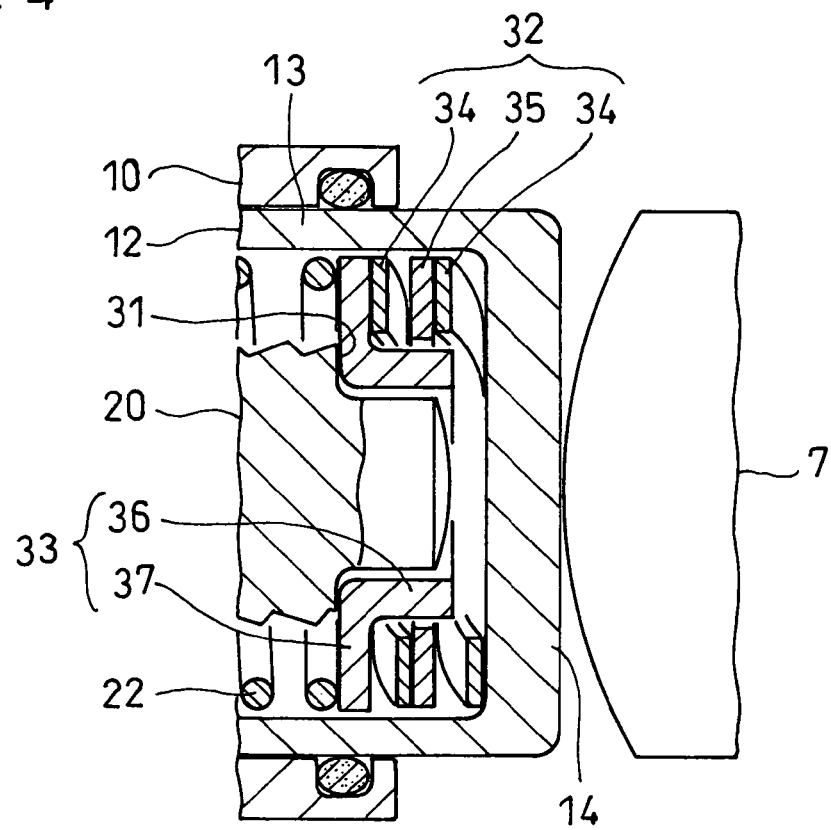
FIG. 4 is an enlarged sectional view of the auto-tensioner of FIG. 3, showing its portion where there is the spring member.
Figure 5:
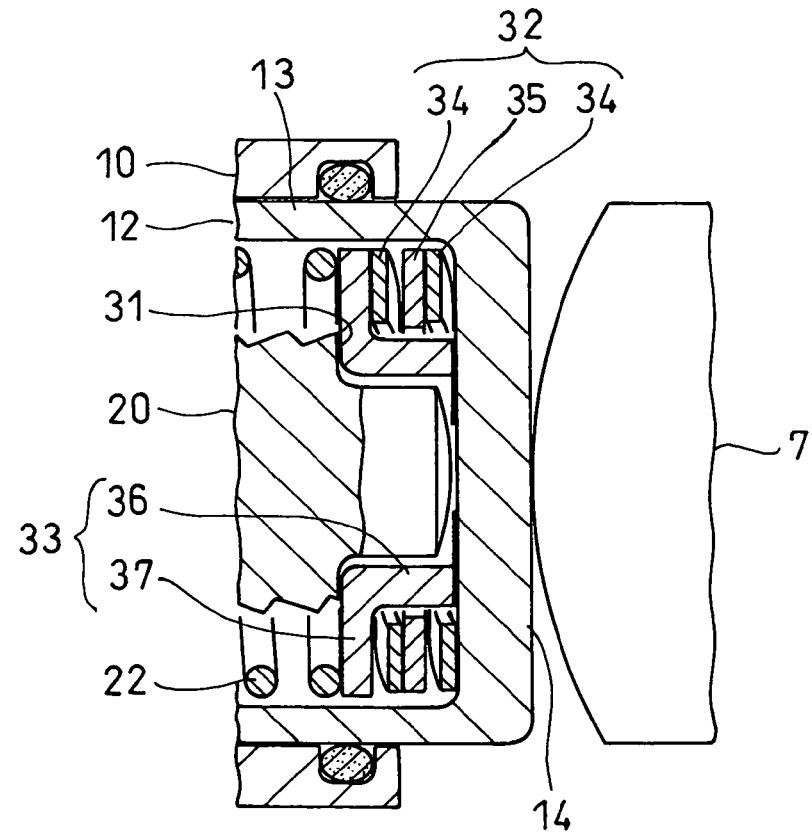
FIG. 5 is a view of the same portion as FIG. 4, wherein the spring member is compressed.

FIGS. 3 and 4 show the auto-tensioner 8 according to the second embodiment of the present invention. Below, elements corresponding to those of the first embodiment are denoted by identical numerals, and their description is omitted.

The screw rod 20 has a large-diameter portion at its portion remote from the bottom portion 14 of the plunger 12 to define a shoulder 31 at the end of the large-diameter portion nearer to the bottom portion 14. Between the shoulder 31 and the bottom portion 14, a spring bearing 33 is provided which is supported by the bottom portion 14 through a ring-shaped spring member 32. The shoulder 31 of the screw rod 20 is in abutment with the spring bearing 33.

The spring member 32 comprises two axially adjacent ring-shaped wave washers 34 and a ring-shaped flat washer 35 disposed between the wave washers 34.

The spring bearing 33 comprises a cylindrical stopper portion 36 that faces the inner surface of the spring member 32, and a flange 37 radially outwardly extending from one end of the stopper portion 36 and supporting the spring member 32. The stopper portion 36 abuts the bottom portion 14 of the plunger 12 when the spring member 32 is axially compressed, thereby restricting the stroke of the spring member 32 when compressed.

As in the first embodiment, when the tension of the chain 5 changes, the plunger 12 moves axially until the sum of the spring forces of the return spring 22 and the spring 23 balances with the tension of the chain 5, thereby reducing the tension of the chain 5.

If the tension of the chain increases sharply (due e.g. to resonance of the engine or large fluctuations in torque of the crankshaft or rotational resistance of the camshafts, per combustion cycle), the plunger 12 moves axially while compressing the spring member 32 as shown in FIG. 4, thereby quickly reducing the tension of the chain 5.

Because the screw rod 20 and the nut member 18 are both formed separately from the plunger 12, any force applied to the bottom portion 14 of the plunger 12 in a direction perpendicular to the axis of the plunger 12 is less likely to be transmitted to the screw rod 20, so that the axes of the external and internal threads 19 and 17 are less likely to be displaced from each other. This ensures stable operation of the auto-tensioner 8.

Because the screw rod 20 and the nut member 18 are received in the cylindrical plunger 12 having a closed bottom, the screw rod 20 and the nut member 18 overlap with the cylindrical portion 13 of the plunger 12 in the direction perpendicular to their axis. The entire auto-tensioner 8 is thus sufficiently short in length, and can be mounted in a small space.

If the tension of the chain 5 increases sharply, the spring member 32 is compressed, thus quickly reducing the tension of the chain 5. Thus, even while the tension of the chain is changing sharply, the tension of the chain is less likely to increase excessively. The auto-tensioner 8 can thus prolong the lifespan of the chain 5.

Further, with this auto-tensioner 8, it is possible to adjust the stroke of the plunger 12 when the spring member 32 is compressed by changing the axial length of the stopper portion 36 of the spring bearing 33.

What is claimed is:

1. An auto-tensioner comprising:
   a housing having an open end and a closed bottom at another end;
   a cylindrical plunger having an opening that faces said closed bottom of said housing and slidably inserted in said housing with one end thereof protruding from said housing;
   a ring-shaped seal member mounted between an inner periphery of said housing and an outer periphery of said plunger for hermetically sealing oil in said housing;
   a screw rod mounted in said plunger so as to be coaxial with said plunger, said screw rod being a separate member from said plunger;
   a nut member mounted in said plunger so as to be coaxial with said plunger, said nut member being a separate member from said plunger, and said nut member being in threaded engagement with said screw rod;
   a return spring mounted between said nut member and said plunger and biasing said nut member and said plunger in a direction axially away from each other such that said nut member is biased toward said closed bottom of said housing and said plunger is biased away from said closed bottom of said housing; and
   a spring mounted between said screw rod and said closed bottom of said housing and biasing said screw rod in a direction away from said closed bottom of said housing.

2. The auto-tensioner of claim 1 wherein said plunger has a bottom portion, and wherein said auto-tensioner further comprises a spring member, and a spring bearing disposed between said screw rod and said bottom portion of said plunger and supported by said bottom portion of said plunger through said spring member, said screw rod being in abutment with said spring bearing.

3. The auto-tensioner of claim 1 wherein said spring bearing includes a stopper portion configured to abut said bottom portion of said plunger when said spring member is compressed.

4. The auto-tensioner of claim 2 wherein said spring member comprises at least two axially adjacent wave washers, and a flat washer disposed between said at least two wave washers.

5. The auto-tensioner of claim 1 wherein said plunger is constituted by a deep drawn metallic plate.

6. The auto-tensioner of claim 1 wherein said seal member comprises an O-ring.

* * * * *